(12) United States Patent
Chikaraishi

(10) Patent No.: US 6,328,128 B1
(45) Date of Patent: Dec. 11, 2001

(54) ELECTRIC POWER STEERING APPARATUS

(75) Inventor: Kazuo Chikaraishi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/494,381

(22) Filed: Jan. 31, 2000

(30) Foreign Application Priority Data

Jul. 19, 1999 (JP) .................................................. 11-204474
Nov. 9, 1999 (JP) .................................................. 11-317967

(51) Int. Cl.[7] ...................................................... B62D 5/04
(52) U.S. Cl. ............................ 180/446; 180/443; 701/41; 701/42; 701/44; 73/781; 73/847; 73/862.321
(58) Field of Search .................................... 180/443, 444, 180/446; 73/814, 847, 862.321, 781; 701/42, 44, 41; B62D 5/04

(56) References Cited

U.S. PATENT DOCUMENTS

| | | | |
|---|---|---|---|
| 4,687,976 | * | 8/1987 | Shimizu ................................. 318/432 |
| 4,724,711 | * | 2/1988 | Sakakibara ......................... 73/862.33 |
| 4,855,655 | * | 8/1989 | Shimizu ................................. 388/820 |
| 4,922,761 | * | 5/1990 | Onishi ................................. 73/862.33 |
| 5,195,382 | * | 3/1993 | Peilloud ........................... 73/862.321 |
| 5,394,760 | * | 3/1995 | Persson ........................... 73/862.331 |
| 5,641,916 | * | 6/1997 | Satoh .............................. 73/862.331 |
| 5,796,014 | * | 8/1998 | Chikaraishi ...................... 73/862.331 |
| 5,899,294 | * | 5/1999 | Shimizu ................................. 180/444 |
| 5,906,250 | | 5/1999 | Haga et al. ........................... 180/444 |

FOREIGN PATENT DOCUMENTS

| | | | |
|---|---|---|---|
| 197 47 628 C1 | 7/1999 | (DE) | ................................. B62D/5/04 |
| 0 894 694 A2 | 2/1999 | (EP) | ................................. B62D/5/04 |
| 2 273 272 A | 6/1994 | (GB) | ................................. B62D/5/04 |
| 7-267110 | 10/1995 | (JP) | ................................. B62D/5/04 |
| 08-207 798 A | 8/1996 | (JP) | ................................. B62D/5/04 |

* cited by examiner

Primary Examiner—J. J. Swann
Assistant Examiner—David Divine
(74) Attorney, Agent, or Firm—Sughrue, Mion, Zinn, Macpeak & Seas, PLLC (57) ABSTRACT

An electric power steering apparatus has a torque sensor which, if the torsion of a torsion bar is within a predetermined angle, linearly outputs a detection signal converted by a first conversion ratio with respect to the torsion, and if the torsion has exceeded the predetermined angle and is within a limit angle, the torsion sensor outputs a detection signal converted by a second conversion ratio which is lower than the first conversion ratio. Further, if the detection signal has exceeded an upper threshold or dropped below a lower threshold, which thresholds being set outside the range of the detection signal outputted from the torsion sensor in its normal state in which the torsion of the torsion bar is within the limit angle, a determination is made that an abnormality has occurred in the torsion sensor.

9 Claims, 4 Drawing Sheets

ELECTRIC POWER STEERING APPARATUS

BACKGROUND OF THE INVENTION

FIELD OF THE INVENTION

The present invention relates to an electric power steering apparatus.

An electric power steering apparatus for a vehicle, for instance, is disclosed in Japanese Patent Unexamined Publication No. Hei. 8-207798. In the apparatus, while the wheels of the vehicle are steered, a steering torque is detected so as to assist the manual power imparted to a steering wheel. In such a structure, an input shaft receives a steering force from the steering wheel and an output shaft transmits the steering force to the wheels. The input shaft and the output shaft are connected by a torsion bar, and the steering torque necessary for control can be detected by detecting the torsion of such a torsion bar.

In a case where the wheel has come into contact with the shoulder of a road, or the steering wheel has been rotated to a rack end during sudden steering, a large force is transmitted between the input shaft and the output shaft, so that there is a possibility that the large force is applied to the torsion bar. In such a case, if the torsion bar undergoes plastic deformation beyond its elastic limit, the zero reference point of the steering torque changes, so that the control function of the electric power steering apparatus is hampered. Accordingly, a limiting member is generally provided for limiting the relative rotation of the input shaft and the output shaft, thereby functioning to prevent plastic deformation from occurring in the torsion bar even if a large force is applied to it.

Such a limiting member comprises a projecting portion and a recessed portion, the projecting portion being formed on the output shaft and having a cruciform cross section, and the recessed portion being formed on the input shaft and having a corresponding configuration to the projecting portion. During the normal operation, the projecting portion and the recessed portion are not engaged with each other and allow the twisting of the torsion bar. On the other hand, when the relative rotation of the output shaft and the input shaft has become larger than a limit angle, the projecting portion is engaged in the recessed portion, thereby functioning to prevent the excessive twisting of the torsion bar.

Further, although the electric power steering apparatus has been used mainly for subcompact passenger cars with relatively light weight, the electric power steering apparatus has also come to be used for compact passenger cars with heavier weight. In such a compact passenger car with heavier weight, the force from the road surface and the steering force tend to become large, so that there is a possibility that the torsion bar becomes twisted to its limit angle, and therefore striking sound occurs frequently due to the collision between the projecting portion of the output shaft and the recessed portion of the input shaft.

In contrast, in the case of an electric hydraulic power steering apparatus which is conventionally used for a compact passenger car and the like, viscosity resistance is produced so as to prevent sudden relative rotation of the input shaft and the output shaft, so that such striking sound has not presented a particular problem.

To suppress such striking sound, it is conceivable to set the limit angle to a large degree such that even if the torsion bar is twisted at a larger angle, the projecting portion of the output shaft and the recessed portion of the input shaft do not collide against each other. However, if the torsion bar is twisted with a large degree, an output signal from a torque sensor increases (or decreases) corresponding therewith, so that there is a possibility that the output signal exceeds a threshold for detecting an abnormality of the torque sensor. If such an output signal, which is outputted from the torque sensor when the torsion bar is twisted with a large degree, exceeds the threshold, an erroneous diagnosis is possibly made that the torque sensor is abnormal although its control circuit is normal, thereby issuing an error signal.

SUMMARY OF THE INVENTION

Accordingly, in view of the above-described problems, an object of the present invention is to provide an electric power steering apparatus which is capable of suppressing the striking sound more effectively.

To this end, in accordance with a first aspect of the present invention, there is provided an electric power steering apparatus comprising:

a housing;

an output shaft for outputting a steering force so as to steer vehicle wheels;

an input shaft for transmitting the steering force from a steering wheel to the output shaft;

a torsion member for connecting the input shaft to the output shaft while being resiliently twisted in correspondence with a steering-torque applied to the input shaft;

a motor attached to the housing for imparting an auxiliary steering force to the output shaft;

a power transmitting mechanism, which couples a rotating shaft of the motor with the output shaft so as to transmit the auxiliary steering force from the motor to the output shaft;

a detecting device for detecting a torsion amount of the torsion member and also outputting a detection signal corresponding to the torsion amount;

a control unit for controlling the motor on the basis of the detection signal from the detecting device; and a limiting member for limiting a relative rotation between the output shaft and the input shaft so as to inhibit the torsion of the torsion member from becoming a limit angle or more, wherein the detecting device outputs a first detection signal converted by a first conversion ratio with respect to the torsion when the torsion of the torsion member is within a predetermined angle which is smaller than the limit angle, and the detecting device outputs a second detection signal converted by a second conversion ratio which is lower than the first conversion ratio when the torsion of the torsion member has exceeded the predetermined angle.

In the above-mentioned apparatus according to the present invention, it is advantageous that the control unit discriminates that an abnormality has occurred in the detecting device when the detection signal outputted from the detecting device has exceeded an upper threshold or dropped below a lower threshold, the upper and lower thresholds being set outside a range of the detection signal outputted from the detecting device in its normal state where the torsion of the torsion member is within the limit angle.

Further, it is advantageous that the torque, to which the torsion member is subjected when the torsion member is twisted up to the limit angle, is −15 N·m or less or 15 N·m or more.

Furthermore, it is advantageous that the detecting device comprises a torque sensor of a non-contact type.

In the above-described structure, it is preferable that the output characteristic of the first detection signal converted by the first conversion ratio depicts a substantially straight line, and the output characteristic of the second detection signal converted by the second conversion ratio depicts a quadratic curve, a sine curve or a periodic curve similar to the sine curve.

In accordance with the above-described first aspect of the present invention, if the torsion of the torsion member is within the predetermined angle, the detecting device outputs a first detection signal converted by the first conversion ratio with respect to the torsion, and if the torsion of the torsion member has exceeded the predetermined angle, the detecting device outputs a second detection signal converted by the second conversion ratio which is lower than the first conversion ratio. Therefore, in the control range of the electric power steering apparatus, that is in the normal control range where the relative angle of the input shaft and the output shaft is within a predetermined angle, it is possible to use a relatively high detection signal converted by the first conversion ratio with respect to the torsion of the torsion member. Further, even in a case where the torsional rigidity of the torsion member is increased to prevent the striking sound of the limiting member, that is the spring constant of the torsion bar becomes high, it is possible to control the motor smoothly. On the other hand, in a region which exceeds the control range, a relatively low detection signal converted by the second conversion ratio with respect to the torsion of the torsion member is outputted, so that when an abnormality signal is outputted from the detecting device, the abnormality signal could be easily discerned therefrom.

Further, the control unit discriminates that an abnormality has occurred in the detecting device when the detection signal outputted from the detecting device has exceeded an upper threshold or dropped below a lower threshold, the upper and lower thresholds being set outside a range of the detection signal outputted from the detecting device in its normal state where the torsion of the torsion member is within the limit angle. Therefore, the abnormality of the detecting device can be accurately detected even though the allowable torque of the torsion member is increased.

Furthermore, if the torsional rigidity of the torsion member is increased to such an extent that the torque to which the torsion member is subjected when the torsion member is twisted up to the limit angle is -15 N·m or less or 15 N·m or more, the striking sound of the limiting member can be effectively suppressed.

In accordance with a second aspect of the present invention, there is provided an electric power steering apparatus comprising:

a housing;

an output shaft for outputting a steering force so as to steer vehicle wheels;

an input shaft for transmitting the steering force from a steering wheel to the output shaft;

a torsion member for connecting the input shaft to the output shaft while being resiliently twisted in correspondence with a steering torque applied to the input shaft;

a motor attached to the housing for imparting an auxiliary steering force to the output shaft;

a power transmitting mechanism, which couples a rotating shaft of the motor with the output shaft so as to transmit the auxiliary steering force from the motor to the output shaft;

a detecting device for detecting a torsion amount of the torsion member and also outputting a detection signal corresponding to the torsion amount;

a control unit for controlling the motor on the basis of the detection signal from the detecting device; and a limiting member for limiting a relative rotation between the output shaft and the input shaft so as to inhibit the torsion of the torsion member from becoming a limit angle or more, wherein when the control unit determines, based on a detection result of the detection device, that the torsion member has been twisted up to a predetermined angle close to the limit angle, the control unit increases or decreases an output of the motor in a direction in which the torsion of the torsion member is alleviated.

In the above-mentioned apparatus according to the present invention, it is advantageous the control unit determines that the torsion member has been twisted up to a predetermined angle close to the limit angle when the detection signal has exceeded an upper predetermined value or dropped below a lower predetermined value.

In accordance with the above-described second aspect of the present invention, when the control unit determines, based on a detection result of the detecting device, that the torsion member has been twisted up to a predetermined angle close to the limit angle, the control unit increases or decreases the output of the motor in the direction in which the torsion of the torsion member is alleviated. Therefore, it is possible to effectively suppress the striking sound of the limiting member.

The above and other objects, features and advantages of the present invention will become more apparent from the following detailed description of the invention when read in conjunction with the accompanying drawings.

DETAILED DESCRIPTION OF THE PREFERRED EMBODIMENTS

Referring now to the accompanying drawings, a detailed description will be given of the embodiments of the present invention.

Figure 1:
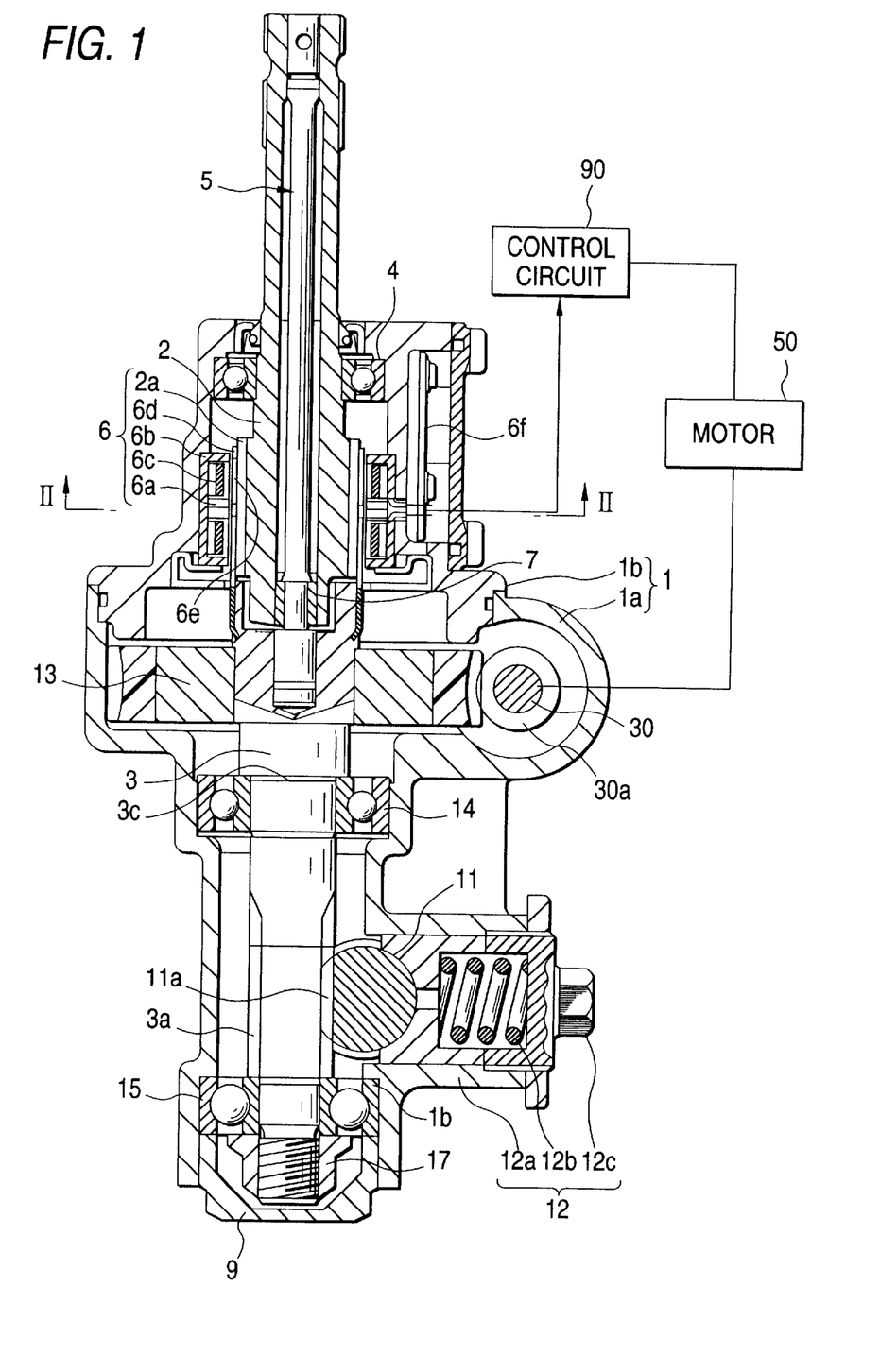
FIG. 1 is a cross-sectional view along the axis of an input shaft showing an embodiment of an electric power steering apparatus according to the present invention.
Figure 2:
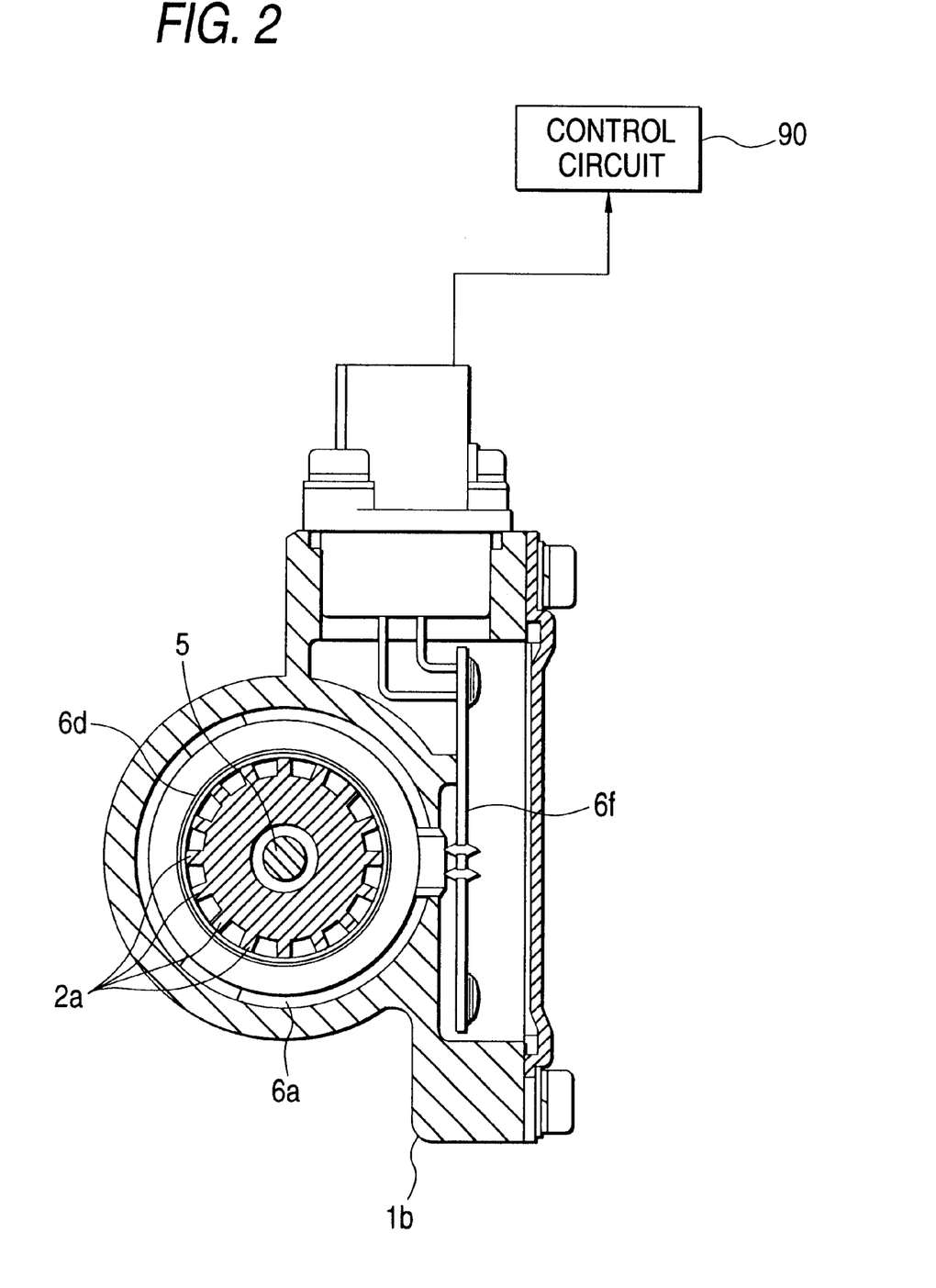
FIG. 2 is a cross-sectional view in the direction of arrows along line II—II, of the electric power steering apparatus shown in FIG. 1.

FIG. 1 is a cross-sectional view, taken along the axis of an input shaft, of an embodiment of an electric power steering apparatus of the present invention. FIG. 2 is a cross-sectional view, taken in the direction of arrows along line II—II, of the electric power steering apparatus shown in FIG. 1.

In FIG. 1, an input shaft 2 and an output shaft 3 extend in a housing 1 including a main body 1a and a cover member 1b. The input shaft 2, which is hollow, has an upper end connected to a steering shaft (not shown), and the steering shaft is connected to a steering wheel (not shown). The input shaft 2 is supported by means of a bearing 4 in such a manner as to be rotatable with respect to the housing 1. A torsion bar 5 serves as a torsion member extending through the input shaft 2 in such a state that an upper end thereof connects to the input shaft 2 and a lower end thereof connects to the output shaft 3 by press-fitting through a bushing 7.

A detecting device, that is a torque sensor 6, is provided around a lower end of the input shaft 2 for detecting a steering torque on the basis of the twisting of the torsion bar 5 in proportion to the received torque therefrom. This torque sensor 6 is the so-called rotary-type non-contact torque sensor, and comprises an electromagnetic yoke cover 6a, an electromagnetic yoke 6b, a coil 6c, a sleeve 6d, and 16 teeth 2a. The electromagnetic yoke cover 6a is attached to the housing 1. The sleeve 6d is made of a magnetic material and attached to an upper end of the output shaft 3 so as to be located inwardly of the coil 6c. The 16 teeth 2a are formed at equal intervals on the outer periphery of the lower end of the input shaft 2.

The torque sensor 6 detects the positional offset in the rotating direction between windows 6e formed in the outer periphery of the sleeve 6d and the teeth 2a of the input shaft 2 as a change in the impedance in the coil 6c. The positional offset corresponds to the relative angular displacement of the input shaft 2 and the output shaft 3 based on the torsion of the torsion bar 5. Then the detected positional offset by the torque sensor 6 is outputted to an external control circuit 90 as an electrical signal through a circuit board 6f. Such an external control circuit 90 is able to detect the steering torque transmitted between the input shaft 2 and the output shaft 3 on the basis of the inputted electrical signal. It should be noted that since such a torque sensor is disclosed in, for example, Japanese Patent Unexamined Publication No. Hei. 8-240491, a detailed description will not be given hereunder.

A pinion 3a, as a worm gear, on the central portion of the output shaft 3, and meshes with rack teeth 11a of a rack shaft 11 extending in the direction perpendicular to the output shaft 3. The rack shaft 11 is supported at its rear surface by a known rack supporting device 12 including a rack guide 12a, a spring 12b and a lock member 12c, and is pressed against the pinion 3a.

A worm wheel 13 is fixedly attached to the outer periphery of a vicinity of an upper end of the output shaft 3 by press-fitting and the like. The worm wheel 13 meshes with a worm 30a connected to a rotating shaft 30 of an electric motor 50, so that rotation of the electric motor is transmitted to the output shaft 3 via the rotating shaft 30, the worm 30a and the worm wheel 13. This electric motor is connected to the control circuit 90, the control circuit is inputted information such as the output of the torque sensor 6 and the vehicle speed so as to supply predetermined electric power to the electric motor, thereby generating appropriate assisting torque.

An inner ring of an upper bearing 14 is fitted to the output shaft 3 below the worm wheel 13, while an inner ring of a lower bearing 15 is fitted to a lower end of the output shaft 3 and is fixed by a nut 17. Accordingly, the output shaft 3 is rotatably supported in the main body ha by means of angular contact ball bearings 14 and 15. As a threaded cover 9 is screwed into the housing 1, the lower bearing 15 is fixed to a stepped portion id of the housing 1.

Further, a stepped portion 3c is formed on the outer peripheral surface of the output shaft 3 below the worm wheel 13. An inner ring 14a of the bearing 14 abuts against the stepped portion 3c.

Figure 3:
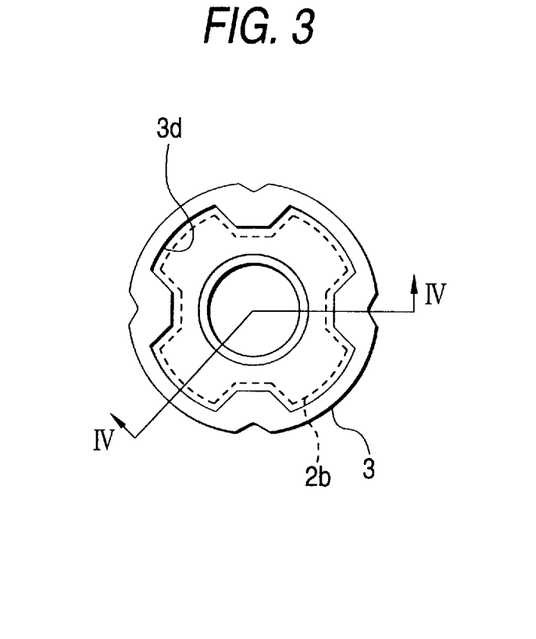
FIG. 3 is a top view of an output shaft.
Figure 4:
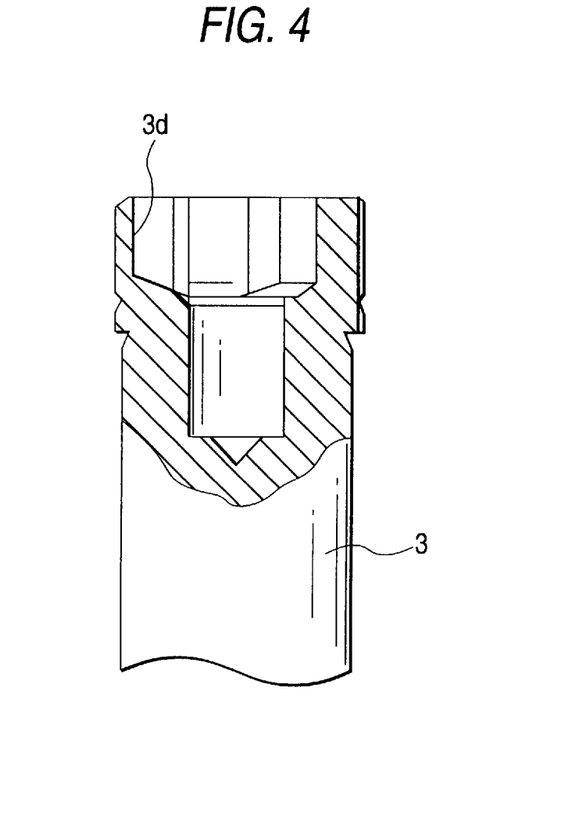
FIG. 4 is a cross-sectional view in the direction of arrows along line IV—IV, of the output shaft shown in FIG. 3.

FIG. 3 is a top view of the output shaft 3, and FIG. 4 is a cross-sectional view, taken in the direction of arrows along line IV—IV, of the output shaft 3 shown in FIG. 3. In FIG. 3, a substantially cruciform recessed portion 3d is formed on an upper surface of the output shaft 3. On the other hand, a lower end 2b of the input shaft 2, which has a substantially cruciform cross section, is entered in the recessed portion 3d, as shown by the dotted line in FIG. 3.

The lower end 2b of the input shaft 2 has a recessed portion substantially similar to the recessed portion 3d of the output shaft 3, but is formed with a slightly smaller shape. Accordingly, the relative rotation of the input shaft 2 and the output shaft 3 in both directions is allowed until the lower end 2b abuts against the inner wall of the recessed portion 3d, however, their further relative rotation is prohibited when the lower end 2b has abutted against the inner wall of the recessed portion 3d. The angle of relative rotation of the input shaft 2 and the output shaft 3 from a neutral position at the time when the lower end 2b has abutted against the inner wall of the recessed portion 3d will be referred to as a limit angle. It should be noted that the lower end 2b and the recessed portion 3d constitute a limiting member.

Next, a description will be given of the operation of the embodiment in accordance with the present invention.

If the vehicle is in a straightly advancing state, and the steering force is not being inputted to the input shaft 2 through the steering wheel (not shown) and the steering shaft (not shown), the torque sensor 6 does not generate an output signal, so that the electric motor does not produce an auxiliary steering force.

If the driver steers the steering wheel (not shown) when the vehicle is to make a turn at a curve, the torsion bar 5 is twisted in correspondence with the steering force, and then the relative rotation occurs between the input shaft 2 and the output shaft 3. Then the torque sensor 6 outputs a signal in correspondence with the direction and amount of this relative rotation. On the basis of this signal, the electric motor rotates and generates the auxiliary steering force. Such rotation of the electric motor is reduced and is transmitted to the output shaft 3 by the worm gear mechanism (30a, 13), thereby assisting the movement of the rack shaft 11.

Figure 5:
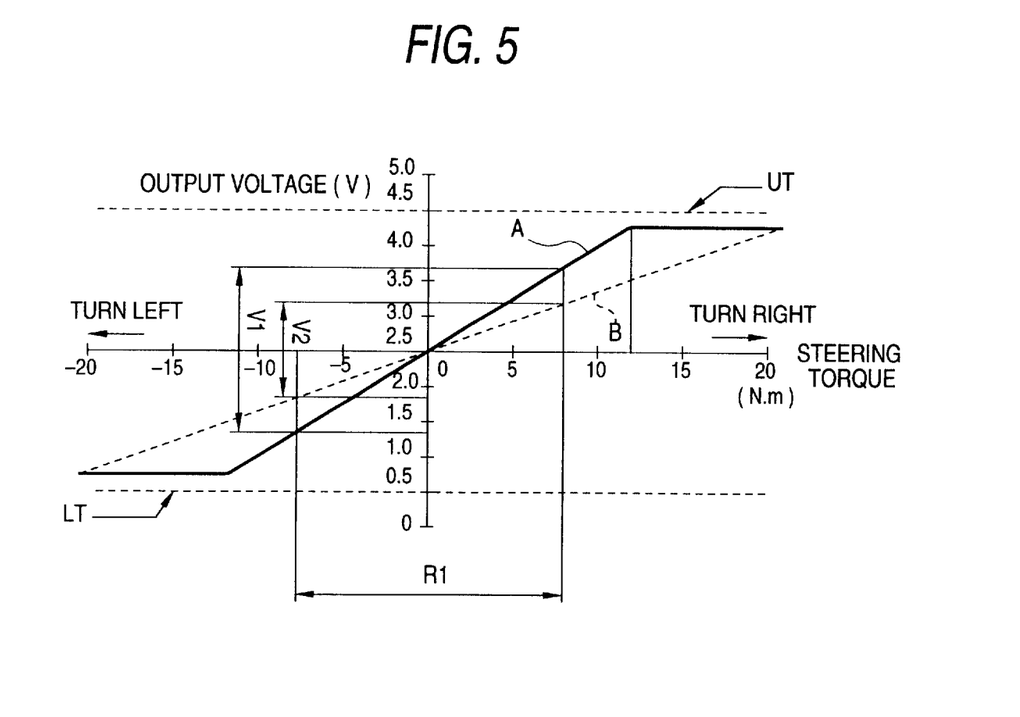
FIG. 5 is a graph illustrating the output characteristic of a torque sensor by taking as the abscissa the steering torque and by taking as the ordinate the output voltage from the torque sensor.
Figure 6:
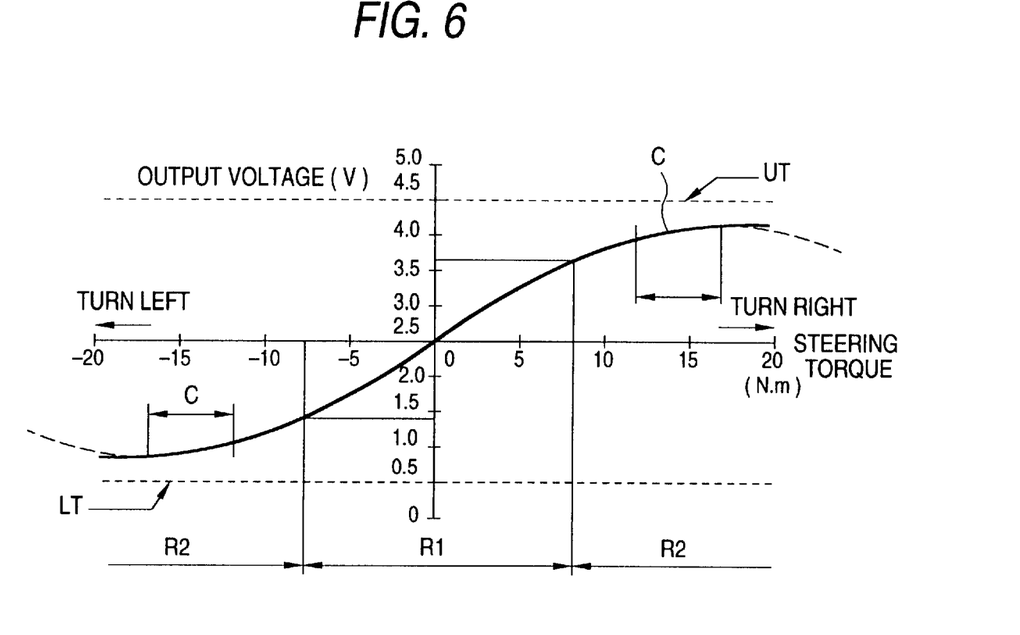
FIG. 6 is a graph illustrating the output characteristic of the torque sensor by taking as the abscissa the steering torque and by taking as the ordinate the output voltage from the torque sensor.

FIGS. 5 and 6 are graphs illustrating the output characteristic of the torque sensor 6 by taking as the abscissa the steering torque transmitted between the input shaft 2 and the output shaft 3 and by taking as the ordinate the output voltage from the torque sensor 6. When the output voltage is 2.5 V, it assumes that the steering torque is a non-transmitting state, that is a neutral state. It should be noted that although some degree of hysteresis occurs in the actual output characteristic of the torque sensor 6 on the basis of frictional resistance, an ideal state in which there is no hysteresis is shown in FIGS. 5 and 6.

A range R1 in which the steering torque is −8 N·m to 8 N·m is the normal control range of the electric power steering apparatus. In the conventional art, when such a range is exceeded (e.g., when the steering torque has dropped below −12 N·m or exceeded 12 N·m), the cruciform lower end 2a of the input shaft 2 shown in FIGS. 3 and 4 abuts against the inner wall of the recessed portion 3d of the output shaft 3 and further relative rotation of the input shaft 2 and the output shaft 3 is prohibited, thereby preventing the plastic deformation and the like of the torsion member 5.

Accordingly, when the steering torque has dropped below −12 N·m or exceeded 12 N·m, the torsion bar 5 is not twisted any further, so that the torque sensor 6 outputs a fixed value (4.2 V or 0.7 V), as indicated by the solid line A in FIG. 5.

However, there are cases where a sudden impulsive force is inputted from the side of the wheel due to its contact with the shoulder of the road, such that the impulsive force is transmitted through the rack shaft 11, thereby applying a relatively large torque (±15 to 20 N·m) between the input shaft 2 and the output shaft 3. In such a case, the cruciform lower end 2a of the input shaft shaft 2 shown in FIGS. 3 and 4 impulsively abuts against the inner wall of the recessed portion 3d of the output shaft 3, resulting in the striking sound.

One idea to prevent this striking sound is to increase the torque at the time when the cruciform lower end 2a of the input shaft 2 abuts against the inner wall of the recessed portion 3d of the output shaft 3 (this torque will be hereafter referred to as the stopper-locking torque at the time of locking by the stopper). By citing a round bar as an example, a description will be given of the design of the torsion bar 5 for increasing such the stopper-locking torque.

If it is assumed that the diameter of the round bar is D, its length is L, and its factor of transverse elasticity is G, then the maximum shear stress at torque T is $\tau = 16\,T/\pi D^3$, and the angle of torsion of the round bar due to the torque is $\theta = 32\,TL/\pi GD^4$, and the spring constant of the torsion bar is $K = T/\theta$.

To increase the stopper-locking torque, it is conceivable that a design is made without changing the spring constant of the torsion bar 5, and a design is made by changing the spring constant.

First, the design without changing the spring constant of the torsion bar 5 will be considered. In this case, the angle of torsion must be enlarged to increase the stopper-locking torque. However, since the torsion bar 5 is repeatedly subjected to torsion, its allowable shear stress is determined from an SN diagram of the material, and therefore it is difficult to enlarge the maximum shear stress in proportion to the angle of torsion. Accordingly, the diameter D and the length L are changed with the maximum shear stress fixed.

If it is assumed that, with both the spring constant K and the maximum shear stress $\tau$ fixed, the maximum angle of torsion $\theta$, the diameter D, and the length L after the maximum torque is changed from T to $T_1$, are respectively $\theta_1$, $D_1$, and $L_1$, the following relationships can be obtained from the above formulae.

The condition for fixing the maximum shear stress is $T_1/T = (D_1/D)^3$.

The condition for fixing the spring constant is $L_1/L = (D_1/D)^4$.

As a result, if the torque at the time of coming into contact with the stopper is set to 2-fold, the diameter D of the torsion bar 5 must be set to approximately 1.26-fold, and its length L to approximately 2.52-fold.

However, if the torsion bar 5 becomes long, the overall apparatus becomes large in size, so that problems arise in the cost, weight, and the like. Further, if the torque sensor 6 is provided on a steering column, a problem arises in that the stroke for absorbing energy during a collision cannot be made sufficiently long by the elongated portion of the torque sensor 6. Accordingly, it becomes essential to make the design by changing the spring constant in order to enlarge the stopper-locking torque.

Next, the design by changing the spring constant will be considered.

If it is assumed that, with both the length of the torsion bar 5 and the maximum shear stress $\tau$ fixed, the spring constant K, the maximum angle of torsion $\theta$, and the diameter D after the maximum torque is changed from T to $T_1$ are respectively $K_1$, $\theta_1$, $D_1$, and $K_1 = aK$, the following relationships can be obtained from the above formulae.

The condition for fixing the maximum shear stress is $T_1/T = (D_1/D)^3$.

The condition for fixing the length L is $a = (D_1/D)^4$.

The relationship between the angle of torsion and the torque is $T_1/T = a\theta_1/\theta$.

As a result, if the torque at the time of locking by the stopper is set to 2-fold ($T_1/T = 2$), the diameter D of the torsion bar 5 becomes approximately 1.26-fold, its spring constant $K_1$ becomes approximately 2.52-fold, and its maximum angle of torsion $\theta$ becomes approximately 0.79-fold.

Therefore, it becomes essential to make the design by making the length L of the torsion bar as short as possible and enlarging the spring constant in order to design the torsion bar 5 with a large stopper-locking torque.

If the spring constant of the torsion bar 5 is made high, the cruciform lower end 2a of the input shaft 2 shown in FIGS. 3 and 4 does not abut against the inner wall of the recessed portion 3d of the output shaft 3 even if a relatively large torque (±15 to 20 N·m) is applied between the input shaft 2 and the output shaft 3 based on the impulsive force from the road, thereby making it possible to prevent the occurrence of the striking sound. In addition, there is an advantage in that, even in a range in which the steering torque is lower than −12 N·m or higher than 12 N·m, the torque sensor 6 is able to generate an output corresponding to the steering torque.

However, if the spring constant of the torsion bar 5 becomes high, the output characteristic of the torque sensor 6 becomes such as the one indicated by the dotted line B in FIG. 5, and an output voltage V2 from the torque sensor 6 in the normal control range R1 becomes 1.8 V to 3.2 V. Accordingly, since the output range declines about 40% as compared with an output voltage V1 which is 1.3 V to 3.7 V being an output voltage prior to the increase of the torsional rigidity of the torsion bar 5, there is a possibility that control becomes rough by that margin.

More specifically, if the design is made by enlarging the spring constant of the torsion bar 5 so as to set the stopper-locking torque to be large, the displacement per angle of torsion decreases, so that the output from the torque sensor 6 becomes small. Hence, there is a possibility that the torque detection accuracy declines, deteriorating the steering feeling of the driver. On the other hand, in a case where a converting mechanism portion is modified so as to make the displacement per angle of torsion large, the friction component attributable to the mechanism portion is also amplified, the hysteresis component of the sensor characteristics also increases, and the torque detection accuracy similarly declines, thereby possibly deteriorating the steering feeling.

In contrast, in conjunction with the fact that the torsional rigidity of the torsion bar 5 is increased, it is conceivable to increase the ratio (conversion ratio) of the output voltage of the torque sensor 6 to the angle of torsion of the torsion bar 5 by increasing, for instance, the number of the windows 6e of the sleeve 6d and the number of the teeth 2a of the input shaft 2 in the torque sensor 6. However, if the output voltage of the torque sensor 6 drops below 0.5 V (lower threshold LT) or exceeds 4.5 V (upper threshold UT), the control circuit 90 determines that an abnormality has occurred in the torque sensor 6. Therefore, if the ratio of the output voltage of the torque sensor 6 to the angle of torsion of the torsion bar 5 is merely increased, an output voltage close to such a threshold LT or UT apts to be generated, so that an error signal is apt to occur. Hence, there is the possibility that the function of the electric power steering apparatus is hampered.

Accordingly, in an embodiment according to the present invention, as shown in FIG. 6, in the normal control range R1 in which the relative angle of the input shaft 2 and the output shaft 3 is within a predetermined angle, the output voltage from the torque sensor 6 is varied substantially linearly in the range of 1.3 V to 3.7 V at a first conversion ratio. However, in the range R2 in which the steering torque is lower than −8 N·m or exceeds 8 N·m, an arrangement is provided such that the rate of change becomes alleviated by using a second conversion ratio which is lower than the first conversion ratio, i.e., such that the output characteristic depicts a quadratic curve because such a conversion ratio may be a variable value. Accordingly, a sine curve and a periodic curve similar to the sine curve are included as the output characteristic. As a result, high accuracy control can be provided in the control range R1, whereas the output voltage is made difficult to drop below the threshold LT or exceed the threshold UT in the range R2. Incidentally, according to the output characteristic of the torque sensor 6 in the embodiment shown in FIG. 6, the stopper-locking torque can be expanded from −12 N·m to −17 N·m and from 12 N·m to 17 N·m, that is the stopper-locking torque can be expanded within a range C as shown in FIG. 6. However, in this embodiment, the torque, to which the torsion bar is subjected when the torsion bar is twisted up to the limit angle, is preferably set to be −15 N·m or less or 15 N·m or more.

Furthermore, as another embodiment according to the present invention, if the output voltage from the torque sensor 6 has exceeded, for example, 4.0 V (or has dropped below 1.0 V), it is conceivable that the control circuit 90 may control in such a manner as to increase or decrease the rotational torque outputted from the drive motor in the direction in which the torsion of the torsion bar 5 is alleviated, upon determining that the cruciform lower end 2a of the input shaft 2 shown in FIGS. 3 and 4 has reached a state immediately before abutting against the inner wall of the recessed portion 3d of the output shaft 3 since the torsion bar 5 has been twisted up to a predetermined angle close to the limit angle. Through such control, the strong abutment of the lower end 2a against the recessed portion 3d can be avoided, thereby suppressing the striking sound. It should be noted that by making use the nonlinear output characteristic of the torque sensor shown in FIG. 6, the fact that the torsion bar 5 has been twisted up to the predetermined angle close to the limit angle may be determined in correspondence with the drop in the rate of increase (or rate of decrease) of the output voltage.

Although a detailed description has been given of the embodiments of the present invention, the present invention is not to be construed as being limited to the above-described embodiments, and it goes without saying that changes and modifications may be made, as required, without departing from the spirit and the scope of the present invention. For example, although a non-contact type is used as the torque sensor in the above-mentioned embodiments, it is possible to use a contact-type torque sensor including a helical groove and balls. In such a case, by varying the pitch of the helical groove between the central side and the opposite end sides, it is possible to obtain the output characteristic such as the one shown in FIG. 6.

According to an embodiment of the electric power steering apparatus of the present invention, the detecting device outputs a first detection signal converted by a first conversion ratio with respect to the torsion if the torsion of the torsion member is within a predetermined angle, and the detecting device outputs a second detection signal converted by a second conversion ratio which is lower than the first conversion ratio if the torsion of the torsion member has exceeded the predetermined angle. Accordingly, in the control range of the electric power steering apparatus, it is possible to use a relatively high detection signal converted by the first conversion ratio with respect to the torsion of the torsion member, and even in a case where the torsional rigidity of the torsion member is increased to prevent the striking sound of the limiting member, it is possible to control the motor smoothly.

On the other hand, a relatively low detection signal converted by the second conversion ratio with respect to the torsion of the torsion member is outputted in a region which exceeds the control range, so that the abnormality signal can be easily discerned even though an abnormality signal is outputted from the detecting device.

Further, the control unit discriminates that an abnormality has occurred in the detecting device when the detection signal outputted from the detecting device has exceeded an upper threshold or dropped below a lower threshold, the upper and lower thresholds being set outside a range of the detection signal outputted from the detecting device in its normal state where the torsion of the torsion member is within the limit angle. Accordingly, the abnormality of the detecting device can be accurately detected even though the allowable torque of the torsion member is increased.

According to another embodiment of the electric power steering apparatus of the present invention, when the control unit determines, based on a result of the detecting device, that the torsion member has been twisted up to a predetermined angle close to the limit angle, the control unit increases or decreases the output of the motor in the direction in which the torsion of the torsion member is alleviated. Therefore, it is possible to effectively suppress the striking sound of the limiting member.

What is claimed is:

1. An electric power steering apparatus comprising:

a housing;

an output shaft for outputting a steering force so as to steer vehicle wheels;

an input shaft for transmitting the steering force from a steering wheel to said output shaft;

a torsion member for connecting said input shaft to said output shaft while being resiliently twisted in correspondence with a steering torque applied to said input shaft;

a motor attached to said housing for imparting an auxiliary steering force to said output shaft;

a power transmitting mechanism, which couples a rotating shaft of said motor with said output shaft so as to transmit the auxiliary steering force from said motor to said output shaft;

a detecting device for detecting a torsion amount of said torsion member and also outputting a detection signal corresponding to said torsion amount;

a control unit for controlling said motor on the basis of the detection signal from said detecting device; and a limiting member for limiting a relative rotation between said output shaft and said input shaft so as to inhibit the torsion of said torsion member from becoming a limit angle or more, wherein said detecting device outputs a first detection signal converted by a first conversion ratio with respect to the torsion when the torsion of said torsion member is within a predetermined angle which is smaller than the limit angle, and said detecting device outputs a second detection signal converted by a second conversion ratio which is lower than the first conversion ratio when the torsion of said torsion member has exceeded the predetermined angle.

2. The electric power steering apparatus according to claim 1, wherein said control unit discriminates that an abnormality has occurred in said detecting device when the first or second detection signal that was converted by the first or second conversion ratio is outputted from said detecting device and has exceeded an upper threshold or dropped below a lower threshold, said upper and lower thresholds being set outside a range of the detection signal outputted from said detecting device in its normal state where the torsion of said torsion member is within the limit angle.

3. The electric power steering apparatus according to claim 1, wherein torque, to which said torsion member is subjected when said torsion member is twisted up to the limit angle, is −15 N·m or less or 15 N·m or more.

4. The electric power steering apparatus according to claim 1, wherein said detecting device comprises a torque sensor of a non-contact type.

5. The electric power steering apparatus according to claim 2, wherein said detecting device comprises a torque sensor of a non-contact type.

6. The electric power steering apparatus according to claim 1, wherein an output characteristic of said first detection signal converted by the first conversion ratio depicts a substantially straight line.

7. The electric power steering apparatus according to claim 1, therein an output characteristic of said second detection signal converted by the second conversion ratio depicts a quadratic curve.

8. The electric power steering apparatus according to claim 1, wherein an output characteristic of said second detection signal converted by the second conversion ratio depicts a sine curve.

9. The electric power steering apparatus according to claim 1, wherein an output characteristic of said second detection signal converted by the second conversion ratio depicts a periodic curve.

\* \* \* \* \*